(12) United States Patent
Marissal et al.

(10) Patent No.: US 6,214,960 B1
(45) Date of Patent: Apr. 10, 2001

(54) SHAPED PRODUCTS MANUFACTURED FROM COMPOSITION CONSISTING ESSENTIALLY OF ETHYLENE HOMOPOLYMER

(75) Inventors: Daniel Marissal; Robert E. Sander; Paul Fiasse, all of Houston; Ross M. Mahan, Humble; Steven D. Sandstrum, Kingwood, all of TX (US)

(73) Assignee: Solvay Polyolefins Europe-Belgium, Brussels (BE)

( * ) Notice: Subject to any disclaimer, the term of this patent is extended or adjusted under 35 U.S.C. 154(b) by 0 days.

(21) Appl. No.: 08/825,857

(22) Filed: Apr. 4, 1997

Related U.S. Application Data

(63) Continuation of application No. 08/565,314, filed on Nov. 30, 1995, now abandoned, which is a continuation of application No. 08/286,971, filed on Aug. 8, 1994, now abandoned.

(51) Int. Cl.[7] ............................ C08F 110/02; B60R 13/01
(52) U.S. Cl. ................... 526/352; 526/106; 108/57.25; 108/57.28; 296/39.1; 296/39.2
(58) Field of Search ..................... 526/64, 106, 352; 296/39.1, 39.2; 108/57.25, 57.27, 57.28

(56) References Cited

U.S. PATENT DOCUMENTS

| | | | | |
|---|---|---|---|---|
| 3,083,410 | * | 4/1963 | McGlamery | 526/106 |
| 3,281,405 | * | 10/1966 | Hogan | 526/352 |
| 4,289,863 | * | 9/1981 | Hill et al. | 526/106 |
| 4,312,967 | * | 1/1982 | Norwood et al. | 526/64 |
| 4,619,980 | * | 10/1986 | McDaniel et al. | 526/96 |
| 4,910,271 | * | 3/1990 | Bailly et al. | 526/106 |

FOREIGN PATENT DOCUMENTS 1501723    2/1978   (GB) .

OTHER PUBLICATIONS

ASTM Standard D882–83 entitled "Standard Test Methods for TENSILE Properties of Thin Plastic Sheeting" (1983).

ASTM Standard D638–94 entitled "Standard Test Method for Tensile Properties of Plastics" (1994).

Billmeyer, Jr., Fred W., *Textbook of Polymer Science*, Third Ed., John Wiley & Sons, New York, 1984, pp. 340–343.*

Roff et al, Crystalline Olefin Polymers Port II, Interscience Publ., N.Y. 1964, pp 610–611.*

Henkel, Modern Plastics Encyclopedia 1982–1983 pp. 73, 74, 76, 78–80.*

* cited by examiner

*Primary Examiner*—Fred Teskin
(74) *Attorney, Agent, or Firm*—Venable; Marina V. Schneller

(57) ABSTRACT

An ethylene homopolymer having a density of from about 0.956 to about 0.970 g/cm$^3$ and a high load melt index (190° C. and 21.6 kg) of from about 7 to about 21 g/10 min. A continuous polymerization process for the production of the ethylene homopolymer, in the presence of a diluent chosen from the group consisting essentially of n-butane, n-hexane, n-heptane, isobutane, isopentane, isooctane, 2,2-dimethylpropane, cyclopentane, cyclohexane and their mixtures, wherein ethylene is brought into contact with a chromium oxide catalyst deposited on an inorganic support containing from about 0.1 to about 5 wt % chromium and activated at a temperature from about 600 to about 900° C., at a polymerization temperature from about 55 to about 150° C., the ethylene concentration in the diluent being from about 1 to about 10 mol %. A composition consisting essentially of the ethylene homopolymer, the composition having a density of from about 0.956 to about 0.970 g/cm$^3$ and a high load melt index of from about 5 to about 20 g/10 min. A shaped product manufactured from this composition.

4 Claims, No Drawings

SHAPED PRODUCTS MANUFACTURED FROM COMPOSITION CONSISTING ESSENTIALLY OF ETHYLENE HOMOPOLYMER

This application is a continuation, of application Ser. No. 08/565,314, Filed Nov. 30, 1995 now abandoned, which is a continuation of application Ser. No. 08/286,971, Filed Aug. 8, 1994, now abandoned.

FIELD OF THE INVENTION

The invention relates to an ethylene homopolymer which is particularly suitable for the extrusion of heavy gage sheets which can be subsequently thermoformed into very large goods. It also relates to a continuous polymerization process for the production of this ethylene homopolymer. It further relates to a composition consisting essentially of the ethylene homopolymer and to shaped products manufad from this composition, in particular pallets and truck bedliners.

TECHNOLOGY REVIEW

The U.K. Patent Specification GBA-1,501,728 describes polymers, in particular ethylene-hexene copolymers, presenting a melt index measured according to the ASTM D 1238—Condition E standard(at 190° C. under a load of 2.16 kg) from 0.1 to 20 g/10 min and presenting for instance a density from 0.950 to 0.952 g/cm$^3$.

Such known ethylene polymers present the drawback that they are not adapted for the manufacture of heavy gage sheets by extrsion, which can subsequently be thermoformed into very large goods. This inconvenience is due to an impropriate combination of melt index and density of the ethylene polymers conferring unadequate mechanical properties such as tensile yield (elongation), tensile impact and fleal modulus.

The invention overcomes this disadvantage by providing a new ethylene polymer which is particulary suitable for the manufacture of very large goods by thermoforming extruded heavy gage sheets. An objective of the invention is to provide an ethylene polymer having simultaneously a particular high load melt index and an elevated density.

SUMMARY OF THE INVENTION

To this end, the invention relates to an ethylene homopolymer having a density of from about 0.956 to about 0.970 g/cm$^3$ and a high load melt index measured according to the ASTM D 1238—Condition F standard (at 190° C. under a load of 21.6 kg) of frog about 7 to about 21 g/10 min.

One of the essential characteristics of the ethylene homopolymers according to the invention which differentiate them from the commercially available ethylene polymers destnted to the mamnfacture of large goods resides in the absence of comonomer. Furthermore, the ethylene homopolymer according to the invention is characterized by a combination of a particular high load melt index with an elevated density. In general the high load melt index (as defined hereabove) of the ethylene homopolymer is at least 9 g/10 min, most often at least 11 g/10 min; the high load melt index generally does not exceed 17 g/10 min, the values of at most 15 g/10 min being the most advantageous. Good results have been obtained with high load melt indices ranging from about 11 to about 15 g/10 min.

In the mjority of cases the ethylene homopolymer presents a density of at least 0.957 g/cm$^3$, in particular at least 0.959 g/cm$^3$; the density is usually at most 0.967 g/cm$^3$, values of at most 0.965 g/cm$^3$ being the most r mended. The particularly preferred densities range from about 0.957 to about 0.963 g/cm$^3$.

DETAILED DESCRIPTION OF THE INVENTION

The ethylene homopolymers according to the invention can be obtained by any known polymerization process, such as polymerization in gas phase, in suspension or in solution. Furthermore, they can be obtained in a continuous or non continuous process, in a single reactor or in a number of reactors arranged in series, the polymezization conditions (tempeare, optonal hydrogen content, type of polymerization medium) in one reactor being different from those used in the other reactors. A suspension polymerization process is preferred, which is advantageously carried out continuously in a loop reactor.

A suspension polymerization is carried out in a hydrocarbon diluent such as liquid aromatic, cycloaliplatic and aliphatic hydrocarbons at a temperature such that at least 80% (preferably at least 90%) of the polymer formed is insoluble therein. Suitable diluents are linear alkanes such as n-butane, n-hexane and n-heptane or branched alkanes such as isobutane, isopentane, isooctane and 2,2-dimethylpropane or cycloaknes such as cyclopentane and cyclohexane or their mixes. The preferred diluents are n-hexane and isobutane. The best results are obtained with isobutane.

The suspension polymerization temperature is generally at least 20° C., in particular at least 55° C., temperatures of at least 90° C. being recommended. The polymerization temperature is usually at most 200° C., preferably at most 150° C., temperatures of at most 110° C. being advantageous. The particularly preferred temperatures range from about 55 to about 150° C., espey from about 90 to about 110° C.

In a discontinuous suspension polymerzation process, the ethylene pressure, which is advantageously kept constant during polymerization, is most often at least equal to atmospheric pressure, in particular at least 0.4 MPa, pressures of at least 0.6 MPa being preferred. The ethylene pressure is generally at most 5 MPa, in particular at most 2 MPa, ethylene pressures of at most 1.5 MPa being the most common.

In a continuous suspension polymerization process, the ethylene pressure is most often such that the concentration of ethylene in the suspension is at least 0.1 mol %, preferably at least 1 mol %, the values of at least 3 mol % being recommended. The ethylene concentration is in general at most 50 mol %, especially at most 20 mol %, values of at most 10 mol % being the most common. The best results are obtained with an ethylene concentration from about 1 to about 10 mol %, in particular from about 3 to about 10 mol %, for instance approximately 7 mol %.

The ethylene homopolymers according to the invention can be obtained in the presence of a molecular mass regulator such as hydrogen. The hydrogen partial pressure is most often from 0.001 to 2 MPa, in particular from 0.002 to 1.5 MPa and preferably from 0.005 to 1.3 MPa. Nevertheless, the polymerization is advantageously carried out in the absence of hydrogen.

The ethylene homopolymers may be obtained in the presence of any type of catalyst capable of polymerizing ethylene, such as, for example, catalysts based on titanium deposited on a support such as an inorganic support containing magnesium in particular magnesium chloride, catalysts based on chromium deposited on a support, in particular an inorganic support contaig silica, or catalysts based on metallocenes optionally suppoed.

The chromium oxide catalysts deposited on a support are especially preferred. The support can be chosen from polymeric and inorganic supports. The inorganic supports are most suitable. They can be selected from mineral oxides such as oxides of silicon, aluminium, titanium, zirconium, thorium and their mixtures, from mixed oxides of these metals such as aluminium silicate, alumimium phosphate and their mtxtures, and from mineral halogenides such as magnesium chloride. Supports contining silica are suitable. Pure silica is preferred.

In the supported chromium oxide catalysts, the chromium is generally present in a proportion of at least 0.05 wt % based on the total weight of the catalyst, in particular at least 0.1 wt %, values of at least 0.25 wt % being recommended. The chromium proportion is usually at most 10 wt %, especially at most 5 wt %, the values of at most 2 wt % being advantageous. Good results have been obtained with chromium proportions of from about 0.1 to about 5 wt %, preferably of from about 0.25 to about 2 wt %.

The chromium oxide catalysts deposited on a support can be obtained in any way known per se by impregnating the support powder with an aqueous or organic solution of a chromium compound, followed by drying in an oxidizing atmosphere. To this end, it is possible to use a chromium compound chosen from the soluble salts such as the oxides, the acetate, the chloride, the sulphate, the chromate and the bichromate in aqueous solution or such as the acetylacetonate in organic solution. After impregnating the support with the chromium compound, the impregnated support is generally activated by heating it in order to convert at least part of the chromium to hexavalent chromium at a temperature of at least 400° C., especially at least 500° C., values of at least 600° C. being recommended. The activation temperature is usually at most 1,100° C., in particular at most 1,000° C., values of at most 900° C. being the most common. The activation is most preferably carried out at a temperature ranging from about 600 to about 900° C., especially from about 700° C. to about 800° C.

The chromium oxide catalysts deposited on a support can also be obtained by means of mechanical mixing of the powder of the support with a solid chromium compound, for example chromium aceylacetonate. This mixture can then be preactivated at a temperature below the melting temperature of the chromium compound before activating it as described above.

As a variant, the chromium oxide catalysts can be obtained by incorporating the chromium compound in the powder of the support during the manufacture of the latter. This is especially usefwl when the support is pred by precipitating a precursor gel, which can then contain the chromium compound. This technique is well known to the man skilled in the art and often called the "cogel" technique.

The invention also relates to a continuous suspension polymerization process capable of and particularly preferred for producing the ethylene homopolymers according to the invention. The continuous polymerization process according to the invention thus consists advantageously in bringing ethylene into contact with a chromium oxide catalyst deposited on an inorganic suuport containing from about 0.1 to about 5 wt % chromium and activated at a temperature from about 600 to about 900° C., in the presence of a diluent chosen from the group consisting essentially of n-butane, n-hexane, n-heptane, isobutane, isopentane, isoocne, 2,2-dimetylprvpane, cyclopentane, cyclohexane and their mixtures, at a polymeriztion temperature from about 55 to about 150° C., the ethylene concentration in the diluent being from about 1 to about 10 mol %.

The best results have been obtained with a continuous polymerization process, which is carried out in a loop reactor and wherein the chromium catalyst is deposited on a silica support and contains firom about 0.25 to about 2 wt % chromium and has been activated at a temperature from about 700 to about 800° C., wherein the diluent is chosen from n-hexane and isobutane, wherein the polymerization temperature is from about 90 to about 110° C. and the ethylene concentration in the diluent is from about 3 to about 10 mol %.

The ethylene homopolymers according to the invention offer the advantage that they can be used for the manufacture of very large goods by thermoforming of extruded heavy gage sheets due to its suitable combination of an elevated density with a particular high load melt index conferrng good mechanical properties. They further do not show a large undesired drop-off of the high load melt index when it is granlated in an extruder.

Most often, the ethylene homopolymer when used for the manufacture of large goods is first mixed, into a composition, with usual additives such as stabilizers (for example anti-acids, antioxidants and/or anti-UV), organic or inorganic colorants (such as, for example, titanium or iron oxides), processing aids or antistatic agents. The content of each of the additives in the composition is generally at most 10 parts by weight per 100 parts by weight of ethylene homopolymer, in particular at most 5 parts by weight, the contents of at most 1 part by weight being recommended, for instance approximately 0.5 part by weight.

The invention therefore also relates to compositions consisting essentially of the above described ethylene homopolymers. The compositions usually contain at least 90 parts by weight of one or more ethylene homopolymers, especally at least 95 parts by weight, the values of at least 99 parts by weight being advantageous, for instance approximately 99.5 parts by weight.

The compositions according to the invention may be obtained by any known means, for example by mixing the ethylene homopolymer with the additives at ambient temperature, optionally followed by mixing at a temperature above the melting temperature of the ethylene homopolymer, for example in a mechanical mixer or in an extruder. An alternative method consists in mixing the additives with the ethylene homopolymer in the melt in an extruder, the exdrudate being granulated at the exit of the extruder or shaped into an article.

The compositions according to the invention present in general a high load melt index of at least 5 g/10 min, most often at least 7 g/10 min, the values of at least 9 g/10 min being recommended. The high load melt index generally does not exceed 20 g/10 min, in particular not 15 g/10 min, the values of at most 13 g/10 min being the most common. Good results have been obtained with high load melt indices ranging from about 5 to about 20 g/10 min, especially from about 9 to about 13 g/10 min.

In the majority of cases the compositions present a density of at least 0.956 g/cm$^3$, especially at least 0.957 g/cm$^3$, the values of at least 0.959 g/cm$^3$ being advantageous. The density usually does not exceed 0.970 g/cm$^3$, more particularly not 0.967 g/cm$^3$, the values of at most 0.965 g/cm$^3$ being preferred. Satisfactory results can be obtained with densities ranging from about 0.956 to about 0.970 g/cm$^3$, especially of from about 0.957 to about 0.963 g/cm$^3$.

Particularly advantageous compositions are fuirther characterized by a tensile yield measured accoding to the ASTIM D638 standard of at least 3,550 psi, preferably at least 3,800 psi, the values of at least 3,940 psi being, recommended. The tensile yield is often at most equal to 4,670 psi, in particular at most 4,380 psi, the values of at most 4,235 psi being preferred. Fseecially advantageous tensile yields range from about 3,550 to about 4,670 psi, preferably from about 3,800 to about 4,235 psi.

In most cases, the compositions according to the invention present additionally a tensile yield elongation measured according to the ASTM D638 standard of at least 5.0%, in particular at least 6.0%, values of at least 6.5% being the most common. The tensile yield elongation is usually at most 8.5%, preferably at most 8.0%, values of at most 7.5% being recommended. The most suitable tensile yield elongations range from about 5.0 to about 8.5%, preferably from about 6.0 to about 8.0%.

Good results have been obtained with compositions presenting also a flexural modulus measured acing to the ASTM D790 Tangent Method 1) standard of at least 160,000 psi, preferably at least 175,000 psi, the values of at least 182,500 psi being advantageous. The flexural modulus is generally at most 219,000 psi, in particular at most 204,000 psi, values of at most 191,000 psi being recommended. Ihe best results have been obtained with flexural moduli ranging from about 160,000 to about 219,000 psi, especially from about 182 500 to about 197,000 psi.

Furthermore, the compositions according to the invention are usually characterized by a tensile impact measured according to the ASIM D1822 standard of at least 210 ft.lb/in$^2$, especially at least 252 ft.lb/in$^2$, the values of at least 294 ft.lb/in$^2$ being the most common. The tensile impact is in general at most 420 ft.lb/in$^2$, particularly at most 378 ft.lb/in$^2$, values of at most 336 ft.lb/in$^2$ being preferred. Perfonning rslts have been obtained with tensile impacts ranging from about 210 to about 420 ft.lb/in$^2$, preferably from about 294 to about 336 ft.lb/in$^2$.

Usually, the compositions according to the invention present a tensile break measured according to the ASTIM D638 standard of at least 3,650 psi, especially at least 4,350 psi. The tensile break does generally not exceed 5,850 psi, in particular not 5,150 psi.

The compositions according to the invention commonly present a tensile break elongation measured according to the ASTM D638 standard of at least 750%, preferably at least 850%. The tensile break elongation is often at most 1,100%, advantageously at most 950%.

The compositions according to the invention are capable of being processed by any of the conventional processes for manufacturing Shae products of ethylene homopolymer and more particularly by thermoforming of extruded heavy gage sheets for the manufacture of large items such as pallets or truck bedliners.

The invention therefore also relates to shpe products manufactured from the compositions described above and more particular to a thermoformed pallet and a thermoformed truck bediner manufactured from a composition according to the invention.

EXAMPLES

The two examples whose description follows serve to illustrate the invention. In these examples ethylene polymers are prepared and their mechanical properties are tested. Example 1 is given by way of reference. The meaning of the symbols employed in these examples, the units expressing the quantities mentioned and the methods of measurement of these quantities are detailed below.

HLMI=high load melt index of the ethylene polymer expressed in g/10 min and measured at 190° C. under a load of 21.6 kg according to ASTM D1238—Condition F standard (1986).

$MI_5$=melt index of the ethylene polymer expred in g/10 min and measured at 200° C. under a load of 5 kg according to the ASTM D1238—condition G standard (1986).

D=density of the ethylene polymer expressed in g/cm$^3$.

Q=width of the molecular mass distribution of the ethylene polymer which is calculated based on the following relation:

$$Q = 0.78 \cdot 10^{\log X}$$

wherein:

$$\log X = 2 \frac{[\log(177470/MI_5) - \log \mu]}{2 - \log(2.53 \cdot MI5)}$$

and $\mu$ is the dynic viscosity of the ethylene polymer measured at 100 s$^{-1}$ (without unity).

TY=tensile yield of the ethylene polymer expressed in psi and measured according to the ASTM D638 standard.

TYE=tensile yield elongation of the ethylene polymer expressed in % and measured according to the ASTM D638 standard.

FM=flexural modulus of the ethylene polymer expressed in psi and measured according to the AsTM D790 (Tangent Method 1) standard.

TI=tensile impact of the ethylene polymer expressed in ft.lb/in$^2$ and measured according to the ASTM D1822 standard.

TB=tensile break of the ethylene polymer expressed in psi and measured according to the ASTM D638 stand.

TBE=tensile break elongation of the ethylene polymer expressed in % and measured according to the ASTM D638 standard.

Example 1 (reference)

In this example an ethylene copolymer has been prepared presenting a density lower than that of the invention ethylene homopolymers. In a continuous loop reactor containing isobutane, at a temperature of 98° C., ethylene and hexene were continuously introduced in such an amount that the concentration of ethylene in the isobutane was 6.9 mol % and that the molar ratio hexene/ethylene in the isobutane was 0.022. The temperature and the concentrations of ethylene and hexene were kept constant during polymerzation. A chromium oxide catalyst deposited on a silica support, containing 1 wt % chromium and presenting a specific surface of approximately 350 m$^2$/g and a pore volume of approximately 1.6 cm$^3$/g, which was previously activated at a temperature of 760° C. in an oxidising atmosphere was also introduced into the reactor in such an amount that the productivity was 5,880 kg ethylene copolymer per kg of catalyst introduced. The ethylene copolymer in this way obtained presented the following characteristics:

$HLMI$ = 16.6

$MI_5$ = 0.67

$D$ = 0.950

$$\mu = 21160$$
$$Q = 13.6.$$

The ethylene copolymer was flrdier mixed with 0.10 wt % of a firs antioxidant [benzen ropanoic acid, 3,5-bis(1,1-dimethylethyl)-4-hydroxy-,2,2-bis((3-(3,5-bis(1,1-dimethylethyl)-4-hydroxyphenyl)-1-oxoprpoxy)methyl)-1,3-propanediyl ester] and with 0.02 wt % of a second antioxidant [bis(2,4-di-t-butyl)pentaerythritol diphosphite] and granulatd. The so obtained granules of ethylene copolymer presented the following chacteristics:

$$HLMI = 10.4$$
$$D = 0.950$$
$$TY = 3500$$
$$TYE = 9.0$$
$$FM = 150000$$
$$TI = 350.$$

Example 2 (in accordance with the invention)

In this example an ethylene homopolymer according to the invention has been prepared.

The operations of example 1 were repeated using the same catalyst with the exception of the following conditions:

the polymerization temperature was 101° C. in stead of 98° C., hexene was not present, the productivity was 6,730 kg of ethylene homopolymer per kg of catalyst in stead of 5,880.

The ethylene homopolymer in this way obtained presented the following characteristics:

$$HLMI = 13.7$$
$$MI_5 = 0.67$$
$$D = 0.961$$
$$\mu = 22380$$
$$Q = 13.0.$$

After mixing the ethylene homopolymer with 0.10 wt % of an antioxidant 150% pentaeryrityl tetrakis(3,5-t-butyl-4-hydroxyphenyl propionate)+50% tris(2,4-di-t-butylphenyl) phosphite] and granulating the mixture, the granules of ethylene homopolymer presented the following characteristics:

$$HLMI = 11.4$$
$$D = 0.961$$
$$TY = 4000$$
$$TYE = 7.0$$
$$FM = 200000$$
$$TI = 230$$

$$TB = 4600$$
$$TBE = 900.$$

A comparison of the us obtained in this example with those obtained in example 1 reveals the progress brought about by the invention ethylene homopolymer insofar as mechanical properties (tensile yield, tensile yield elongation, flexural modulus and tensile impact) and hm drop-off are concerned.

What is claimed is:

1. A thermoformed pallet produced by thermoforming an extruded heavy gage sheet, wherein said extruded heavy gage sheet consists of a composition consisting essentially of an ethylene homo olymer having a density of from 0.957 to 0.970 g/cm$^3$ and a high load melt index measured according to the ASTM D 1238—Condition F standard of from 7 to 21 g/10 min, a tensile break elongation measured according to the ASTIM D638 standard of from 750% to 1100%, and a tensile break measured according to the ASTM D638 standard of from 4350 psi to 5850 psi, said composition prepared with a catalyst consisting essentially of chromium oxide deposited on a support consisting essentially of silica, said chromium oxide catalyst activated by heating at a temperature of from 400° to 900° C.

2. A thermoformed pallet prepared by thermoforming an extruded heavy gage sheet product wherein said heavy gage sheet product consists of a composition consisting essentially of an ethylene homopolymer having a density of from 0.957 to 0.970 g/cm$^3$ and a high load melt index measured according to the ASTM D 1238—Condition F standard of from 7 to 21 g/10 min.

3. A thermoformed truck bedliner produced by thermoforming an extruded heavy gage sheet, wherein, said extruded heav gage sheet consists of a composition consisting essentially of an ethylene homopolymer having a density of from 0.957 to 0.970 g/cm3 and a high load melt index measured according to the ASTM D 1238—Condition F standard of from 7 to 21 g/10 min, a tensile break elongation measured according to the ASTM D638 standard of from 750% to 1100%, and a tensile break measured according to the ASTM D638 standard of from 4350 psi to 5850 psi, said composition prepared with a catalyst consisting essentially of chromium oxide deposited on a support consisting essentially of silica, said chromium oxide catalyst activated by heating at a temperature of from 400° to 900° C.

4. A thermoformed truck bedliner prepared by thermoforming an extruded heavy gage sheet product wherein said extruded heavy gage sheet product consists of a composition consisting essentially of an ethylene homopolymer having a density of from 0.957 to 0.970 g/cm$^3$ and a high load melt index measured according to the ASTM D 1238—Condition F standard of from 7 to 21 g/10 min.

* * * * *